US012676902B2

(12) United States Patent
Miyazaki

(10) Patent No.: US 12,676,902 B2
(45) Date of Patent: Jul. 7, 2026

(54) CONFERENCE SUPPORT DEVICE AND CONFERENCE SUPPORT METHOD

(71) Applicant: JVCKENWOOD Corporation, Yokohama (JP)

(72) Inventor: Yuki Miyazaki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 50 days.

(21) Appl. No.: 18/889,438

(22) Filed: Sep. 19, 2024

(65) Prior Publication Data

US 2025/0016214 A1 Jan. 9, 2025

Related U.S. Application Data

(63) Continuation of application No. PCT/JP2023/008359, filed on Mar. 6, 2023.

(30) Foreign Application Priority Data

Mar. 23, 2022 (JP) ................................. 2022-047519

(51) Int. Cl.
*H04L 65/401* (2022.01)
*G10L 17/22* (2013.01)

(52) U.S. Cl.
CPC ............ *H04L 65/401* (2022.05); *G10L 17/22* (2013.01)

(58) Field of Classification Search
CPC .............................. H04L 65/401; G10L 17/22
See application file for complete search history.

(56) References Cited

U.S. PATENT DOCUMENTS 6,404,873 B1 * 6/2002 Beyda .................... H04M 7/006
379/202.01
2006/0164507 A1 * 7/2006 Eshkoli .................. H04N 7/152
348/14.09
(Continued)

FOREIGN PATENT DOCUMENTS

JP 07-202887 8/1995

OTHER PUBLICATIONS

International Search Report and Written Opinion for International Application Serial No. PCT/JP2023/008359 mailed on May 9, 2023, 8 pages.

*Primary Examiner* — Jonathan A Bui
(74) *Attorney, Agent, or Firm* — Amin, Turocy & Watson, LLP

(57) ABSTRACT

A conference support device includes: a main conference management unit configured to set a main conference and manage connection of terminal devices participating in the main conference; and an individual conference management unit configured to associate a plurality of individual conferences with the main conference and manage connection of the terminal devices participating in each of the plurality of individual conferences. When first utterance data indicating an utterance content with respect to the main conference has been received from the terminal device, the main conference management unit transmits the first utterance data to the individual conference management unit. When the first utterance data has been received from the main conference management unit, the individual conference management unit transmits the first utterance data to the terminal devices participating in each of the plurality of individual conferences. When second utterance data indicating an utterance content with respect to one individual conference has been received from one terminal device participating in the one individual conference, the individual conference manage- (Continued)

ment unit transmits the second utterance data to the terminal devices participating in the one individual conference.

7 Claims, 15 Drawing Sheets

(56)                    References Cited

U.S. PATENT DOCUMENTS

2013/0329866 A1*  12/2013  Mai ...................... H04M 3/563
                                                        379/88.01
2022/0417365 A1*  12/2022  Fowers ................ H04M 3/564
2023/0199036 A1*   6/2023  Panchaksharaiah .. H04L 65/403
                                                        715/758
2023/0199120 A1*   6/2023  Panchaksharaiah ........................
                                                        H04L 65/4015
2023/0230595 A1*   7/2023  Baird .................. H04L 12/1831
                                                        704/235

* cited by examiner

FIG.16

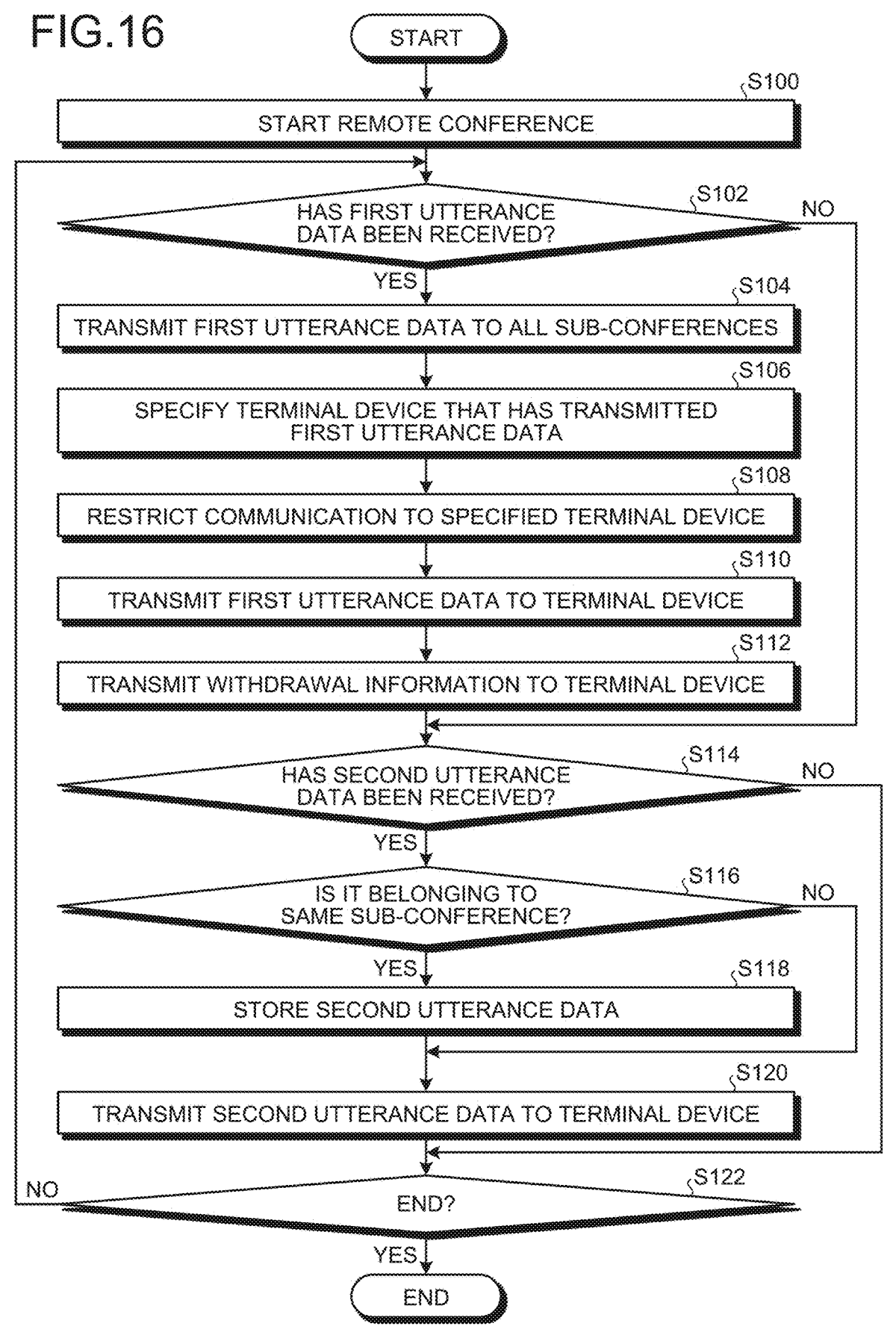

START

S100
START REMOTE CONFERENCE

S102
HAS FIRST UTTERANCE DATA BEEN RECEIVED? — NO

YES

S104
TRANSMIT FIRST UTTERANCE DATA TO ALL SUB-CONFERENCES

S106
SPECIFY TERMINAL DEVICE THAT HAS TRANSMITTED FIRST UTTERANCE DATA

S108
RESTRICT COMMUNICATION TO SPECIFIED TERMINAL DEVICE

S110
TRANSMIT FIRST UTTERANCE DATA TO TERMINAL DEVICE

S112
TRANSMIT WITHDRAWAL INFORMATION TO TERMINAL DEVICE

S114
HAS SECOND UTTERANCE DATA BEEN RECEIVED? — NO

YES

S116
IS IT BELONGING TO SAME SUB-CONFERENCE? — NO

YES

S118
STORE SECOND UTTERANCE DATA

S120
TRANSMIT SECOND UTTERANCE DATA TO TERMINAL DEVICE

S122
END? — NO

YES

END

CONFERENCE SUPPORT DEVICE AND CONFERENCE SUPPORT METHOD

CROSS-REFERENCE TO RELATED APPLICATIONS

This application is a Continuation of PCT International Application No. PCT/JP2023/008359 filed on Mar. 23, 2023 which claims the benefit of priority from Japanese Patent Application No. 2022-047519 filed on Mar. 23, 2022, the entire contents of both of which are incorporated herein by reference.

BACKGROUND

1. Technical Field

The present disclosure relates to a conference support device and a conference support method.

2. Description of the Related Art

In recent years, a remote conference system using an Internet line has been generally used. For example, Japanese Patent Application Laid-Open No. H7-202887 discloses a technology that enables non-public communication between specific participants during a conference.

In a case where a conference in which a plurality of companies participate is held, there is a case where conversation is needed only among participants of a same company instead of the whole company. In this case, it is necessary to control the conversation of the participants of the same company so as not to be transmitted to the whole.

SUMMARY

It is an object of the present disclosure to at least partially solve the problems in the conventional technology.

A conference support device according to the present disclosure that manages a main conference and a plurality of individual conferences to which terminal devices participating in the main conference belong, the conference support device includes, a main conference management unit configured to set the main conference and manage connection of the terminal devices participating in the main conference; and an individual conference management unit configured to associate the plurality of individual conferences with the main conference and manage connection of the terminal devices participating in each of the plurality of individual conferences, wherein the main conference management unit, transmits first utterance data to the individual conference management unit in a case where the first utterance data indicating an utterance content with respect to the main conference has been received from the terminal device, the individual conference management unit, transmits the first utterance data to the terminal devices participating in each of the plurality of individual conferences in a case where the first utterance data has been received from the main conference management unit, and the individual conference management unit further transmits, in a case where second utterance data indicating an utterance content with respect to one individual conference has been received from one terminal device participating in the one individual conference, the second utterance data to the terminal devices participating in the one individual conference.

A conference support method according to the present disclosure for managing a main conference and a plurality of individual conferences to which terminal devices participating in the main conference belong, the conference support method includes: a step of setting the main conference and managing connection of the terminal devices participating in the main conference; a step of associating the plurality of individual conferences with the main conference and managing connection of the terminal devices participating in each of the plurality of individual conferences; a step of transmitting first utterance data to the individual conferences in a case where the first utterance data indicating an utterance content with respect to the main conference has been received from the terminal device; a step of transmitting, in the individual conference, in a case where the first utterance data has been received, the first utterance data to the terminal devices participating in each of the plurality of individual conferences; and a step of transmitting, in the individual conference, in a case where second utterance data indicating an utterance content with respect to one individual conference has been received from one terminal device participating in the one individual conference, the second utterance data to the terminal devices participating in the one individual conference.

BRIEF DESCRIPTION OF THE DRAWINGS

FIG. 16 is a flowchart illustrating a flow of processing of a conference support device according to a third embodiment.

DETAILED DESCRIPTION OF THE PREFERRED EMBODIMENTS

Figure 1:
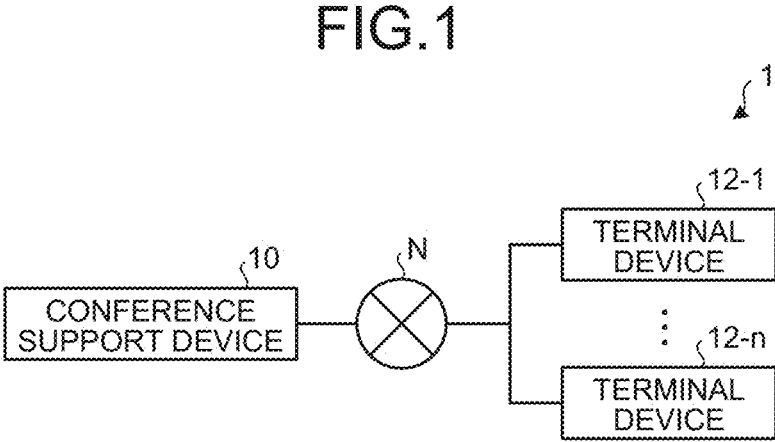
FIG. 1 is a diagram illustrating a configuration example of a conference system according to a first embodiment.

Hereinafter, embodiments according to the present disclosure will be described in detail with reference to the accompanying drawings. Note that the present disclosure is not limited by the embodiments, and in the following embodiments, the same parts are denoted by the same reference numerals, and redundant description will be omitted.

First Embodiment (Conference System)

A configuration example of a conference system according to a first embodiment will be described with reference to FIG. 1. FIG. 1 is a diagram illustrating the configuration example of the conference system according to the first embodiment.

As illustrated in FIG. 1, a conference support system 1 includes a conference support device 10, and a terminal device 12-1 to a terminal device 12-*n* (n is an integer of two or more). In a case where it is not necessary to distinguish the terminal device 12-1 to the terminal device 12-*n*, the terminal devices are collectively referred to as terminal devices 12. The conference support device 10 and the terminal devices 12 are communicably connected via a network N. The conference support system 1 is a system that executes a remote conference (for example, a web conference) among a plurality of participants.

The conference support device 10 is a device that supports the remote conference. The conference support device 10 is realized by a server device or the like. The terminal device 12 is a terminal device used by a participant of the remote conference. In the present embodiment, the terminal device 12 transmits an utterance content of the participant of the remote conference to the conference support device 10. The conference support device 10 supports the remote conference by executing processing according to the utterance content.

[Conference Support Device]

Figure 2:
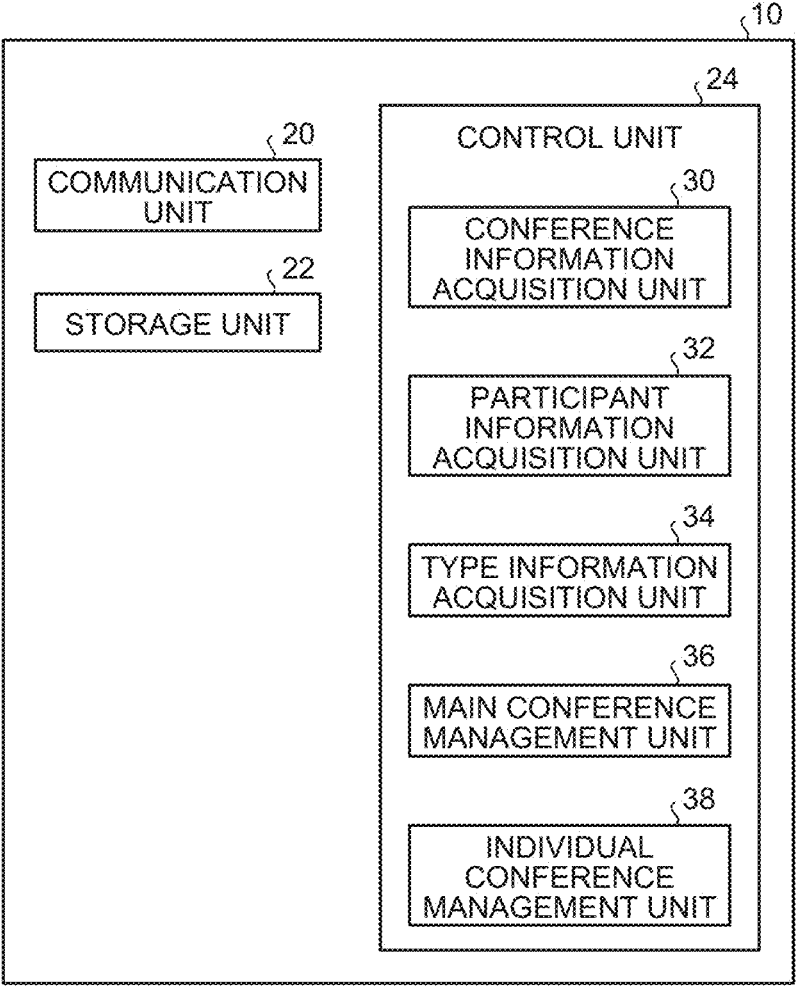
FIG. 2 is a block diagram illustrating a configuration example of a conference support device according to the first embodiment.

The configuration example of the conference support device according to the first embodiment will be described with reference to FIG. 2. FIG. 2 is a block diagram illustrating the configuration example of the conference support device according to the first embodiment.

The conference support device 10 sets and manages a main conference and a sub-conference in a remote conference in which a plurality of participants participate. The main conference refers to a conference in which all participants participating in the remote conference participate. The sub-conference refers to a conference in which specific participants participating in the remote conference participate. The main conference is also referred to as a main conference. The sub-conference is also referred to as an individual conference. The conference support device 10 sets one main conference in the remote conference. The conference support device 10 sets a plurality of sub-conferences in the remote conference. The conference support device 10 supports the remote conference by managing utterance made in the main conference and utterance made in the sub-conference. Here, setting the main conference means performing initial setting for activating a conference program for the main conference and activating the conference program. The setting of the sub-conference means performing initial setting for activating a conference program for the sub-conference and activating the conference program.

As illustrated in FIG. 2, the conference support device 10 includes a communication unit 20, a storage unit 22, and a control unit 24. The conference support device 10 includes, for example, a general-purpose server device or the like.

The communication unit 20 executes communication between the conference support device 10 and an external device via the network N. The communication unit 20 executes, for example, communication between the conference support device 10 and the terminal device 12.

The storage unit 22 stores various types of information. The storage unit 22 stores information such as a calculation content of the control unit 24 and a program. As will be described later, the storage unit 22 stores voice data related to utterance of a participant in the remote conference. The storage unit 22 includes, for example, at least one of a main storage device such as a random access memory (RAM) and a read only memory (ROM), and an external storage device such as a hard disk drive (HDD).

The control unit 24 controls each unit of the conference support device 10. The control unit 24 has, for example, an information processing device such as a central processing unit (CPU) or a micro processing unit (MPU), and a storage device such as a random access memory (RAM) or a read only memory (ROM). The control unit 24 executes a program for controlling an operation of the conference support device 10 according to the present disclosure. The control unit 24 may be realized by, for example, an integrated circuit such as an application specific integrated circuit (ASIC) or a field programmable gate array (FPGA). The control unit 24 may be realized by a combination of hardware and software.

The control unit 24 includes a conference information acquisition unit 30, a participant information acquisition unit 32, a type information acquisition unit 34, a main conference management unit 36, and an individual conference management unit 38.

The conference information acquisition unit 30 acquires conference information related to a remote conference from the terminal device 12 of a participant who holds the remote conference. The conference information includes a holding time of the remote conference, a main conference ID, a sub-conference ID, and the like. The main conference ID includes, for example, access information, identification information of the main conference, type information of the main conference, and the like. The sub-conference ID includes access information, identification information of the sub-conference, type information of the sub-conference, and the like for each set sub-conference. The conference information may include information other than these pieces of information.

The participant information acquisition unit 32 acquires participant information related to all participants who participate in the remote conference from the terminal device 12 of the participant who holds the remote conference. The participant information includes participant identification information for identifying a participant, affiliation information, contact information, and the like. The participant identification information is, for example, information related to a name and a nickname of a participant. The affiliation information is, for example, information related to an organization such as a company to which a participant belongs. The contact information is, for example, information related to a mail address or the like.

The type information acquisition unit 34 acquires type information of utterance indicating whether utterance of a participant in the remote conference is utterance with respect to the main conference or utterance with respect to the sub-conference from the terminal device 12 of the participant who has made the utterance.

The main conference management unit 36 manages connection of a plurality of terminal devices used by each of a plurality of participants based on the conference information acquired by the conference information acquisition unit 30 and the participant information acquired by the participant information acquisition unit 32. The main conference management unit 36 sets a main conference in which all of the plurality of participants can participate. Here, as for a setting timing of the main conference, in a case where a main conference is not activated and there is a registration request for connection to a conference and a registration request by a terminal device that can participate in the main conference for the first time, authentication of the terminal device that has made the registration request may be performed, and in a case where the authentication is permitted, a main conference may be set and activated, and registration processing may be performed to permit connection to the conference for the terminal device for which the authentication has been permitted and register the terminal device. As a setting timing of another main conference, for example, in a case where the time is a predetermined time before a holding time of a main conference, a main conference may be set and activated, and standby may be performed to respond to the registration request from the terminal device. In addition, as the setting timing of the another main conference, for example, in a case where there is a connection request for association with a main conference from a sub-conference and a main conference is not set, a main conference may be set and activated. The main conference management unit 36 receives, from the plurality of terminal devices 12 via the communication unit 20, first utterance data indicating an utterance content of a participant with respect to the main conference. The main conference management unit 36 transmits the first utterance data to the individual conference management unit 38. Here, the utterance data may be transmitted together with terminal identification information for identifying from which terminal device 12 and when voice data is transmitted, and additional information including at least time information such as a time stamp. The additional information may be added as header information of the utterance data. This additional information may be added to a head or a tail of the utterance data as the header information, or in a case where the utterance data is divided in a predetermined size and transmitted, the additional information may be included as the header information in units of division. The first utterance data from the plurality of terminal devices 12 may be mixed by the main conference management unit 36 and transmitted to the individual conference management unit 38. In a case where the first utterance data from the plurality of terminal devices 12 is mixed by the main conference management unit 36, the additional information may be reattached so as to include the terminal identification information of the utterance data that is the subject of mixing, and transmitted. In a case where the first utterance data from the plurality of terminal devices 12 is not mixed by the main conference management unit 36, voice of the utterance data received on the receiving terminal side may be mixed and reproduced based on the time information such as a time stamp included in the first utterance data. Furthermore, the main conference management unit 36 does not directly transmit the first utterance data to the plurality of terminal devices 12.

The individual conference management unit 38 manages connection of a plurality of terminal devices 12 used by each of a plurality of participants based on the conference information acquired by the conference information acquisition unit 30 and the participant information acquired by the participant information acquisition unit 32. The individual conference management unit 38 sets a sub-conference in which specific participants among the plurality of participants participate. Here, as for a setting timing of the sub-conference, in a case where a sub-conference in which the terminal device 12 is to participate is not activated, and there is a registration request for connection to the conference and a registration request by the terminal device 12 that can participate in the sub-conference to be participated for the first time, authentication of the terminal device 12 that has made the registration request may be performed, and in a case where the authentication is permitted, an individual conference may be set and activated, and registration processing may be performed to permit connection to the conference for the terminal device 12 for which the authentication has been permitted and register the terminal device 12. As a setting timing of another sub-conference, for example, in a case where the time is a predetermined time before a holding time of a sub-conference, a sub-conference may be set and activated, and standby may be performed to respond to the registration request from the terminal device 12. Here, at a timing when a sub-conference is newly set and activated, the main conference management unit 36 may be requested to make a connection request to the main conference to associate with the main conference. The individual conference management unit 38 sets a plurality of sub-conferences based on sub-conference IDs included in the conference information. The individual conference management unit 38 receives the first utterance data from the main conference management unit 36. The individual conference management unit 38 receives, from the plurality of terminal devices 12 via the communication unit 20, second utterance data indicating an utterance content with respect to a sub-conference from the terminal devices 12 of the participants participating in the sub-conference. The individual conference management unit 38 transmits the second utterance data to the terminal devices 12 of the participants participating in the sub-conference via the communication unit 20. Here, the utterance data may be transmitted together with terminal identification information for identifying from which terminal device 12 and when voice data is transmitted, and additional information including at least time information such as a time stamp. The additional information may be added as header information of the utterance data. This additional information may be added to a head or a tail of the utterance data as the header information, or in a case where the utterance data is divided in a predetermined size and transmitted, the additional information may be included as the header information in units of division. The second utterance data from the plurality of terminal devices 12 may be mixed by the individual conference management unit 38 and transmitted to the terminal devices 12 of the participants participating in a sub-conference room. In a case where the second utterance data from the plurality of terminal devices 12 is not mixed by the individual conference management unit 38, voice of the utterance data received on the receiving terminal side may be mixed and reproduced based on the time information such as a time stamp included in the second utterance data. In a case where the second utterance data from the plurality of terminal devices 12 is mixed by the individual conference management unit 38, the additional information may be reattached so as to include the terminal identification information of the utterance data that is the subject of mixing, and transmitted. The individual conference management unit 38 transmits the first utterance data to the terminal devices 12 of the participants participating in the sub-conference via the communication unit 20. Here, when the individual conference management unit 38 transmits the first utterance data to the terminal devices 12 of the participants participating in the sub-conference, the first utterance data and the second utterance data may be mixed and transmitted. In a case where the first utterance data and the second utterance data from the plurality of terminal devices 12 are mixed by the individual conference management unit 38, the additional information may be reattached so as to include the terminal identification information of the utterance data that is the subject of mixing, and transmitted. Further, when the first utterance data and the second utterance data are mixed by the individual conference management unit 38, identification flag information indicating that the first utterance data and the second utterance data are mixed may be included in the additional information. In a case where the first utterance data and the second utterance data are not mixed by the individual conference management unit 38, the voice of the utterance data received on the receiving terminal side may be mixed and reproduced based on the time information such as a time stamp included in the first utterance data and the second utterance data. In addition, the individual conference management unit 38 does not transmit the second utterance data to the main conference management unit 36. Here, it should be noted that the utterance content made in the sub-conference managed by the individual conference management unit 38 is managed so as not to be transmitted to the main conference managed by the main conference management unit 36, whereby the utterance made with respect to the sub-conference is surely blocked from the main conference.

[Terminal Device]

Figure 3:
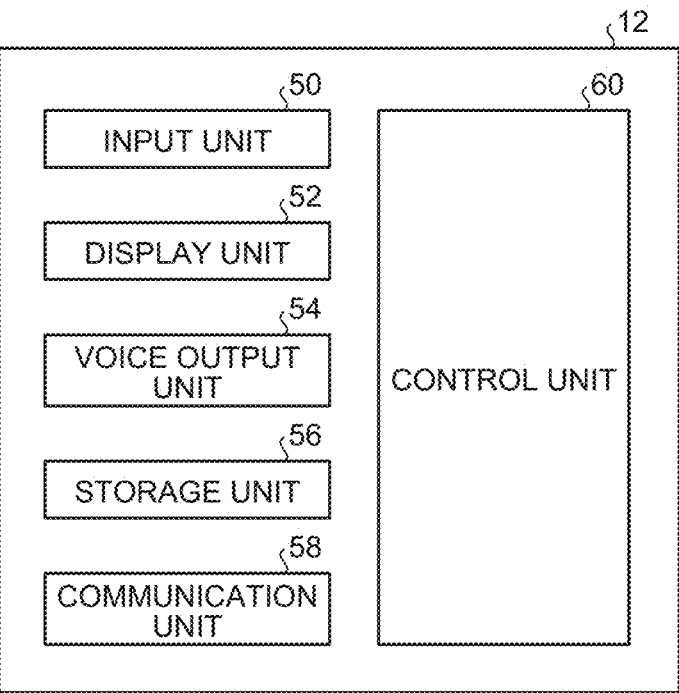
FIG. 3 is a block diagram illustrating a configuration example of a terminal device according to the first embodiment.

The configuration example of the terminal device according to the first embodiment will be described with reference to FIG. 3. FIG. 3 is a block diagram illustrating the configuration example of the terminal device according to the first embodiment.

As illustrated in FIG. 3, the terminal device 12 includes an input unit 50, a display unit 52, a voice output unit 54, a storage unit 56, a communication unit 58, and a control unit 60. The terminal device 12 is, for example, an information terminal device such as a personal computer, a tablet terminal, a smartphone, or a business wireless communication device. In the present embodiment, the terminal device 12 is not particularly limited as long as it is an information terminal device having a communication function.

The input unit 50 receives various input operations with respect to the terminal device 12. The input unit 50 outputs an input signal corresponding to the received input operation to the control unit 60. The input unit 50 includes, for example, a keyboard, a mouse, a touch panel, a button, a switch, a microphone, and the like. In a case where a touch panel is used as the input unit 50, the input unit 50 is disposed on the display unit 52.

The display unit 52 displays various videos. The display unit 52 displays, for example, information related to a setting screen of the remote conference and a display screen of a remote conference. The display unit 52 is a type of notification unit. The display unit 52 is a display including, for example, a liquid crystal display (LCD), an organic electro-luminescence (EL), and the like.

The voice output unit 54 is a speaker that outputs voice. The voice output unit 54 outputs voice uttered by a participant of the remote conference. Here, in a case where it is necessary to receive a plurality of pieces of utterance data and reproduce a plurality of pieces of utterance data at the same time, the utterance data may be mixed based on the time information such as a time stamp and the voice uttered by the participant of the remote conference may be output.

The storage unit 56 stores, for example, a calculation content of the control unit 60 and information such as a program. The storage unit 56 includes, for example, at least one of a main storage such as a RAM and a ROM, and an external storage device such as an HDD.

The communication unit 58 executes communication between the terminal device 12 and an external device. The communication unit 58 executes, for example, communication between the terminal device 12 and the conference support device 10.

The control unit 60 controls each unit of the terminal device 12. The control unit 60 has, for example, an information processing device such as a CPU or an MPU, and a storage device such as a RAM or a ROM. The control unit 60 executes a program for controlling the operation of the terminal device 12 according to the present disclosure. The control unit 60 may be realized by, for example, an integrated circuit such as an ASIC or an FPGA. The control unit 60 may be realized by a combination of hardware and software.

[Management Method]

Figure 4:
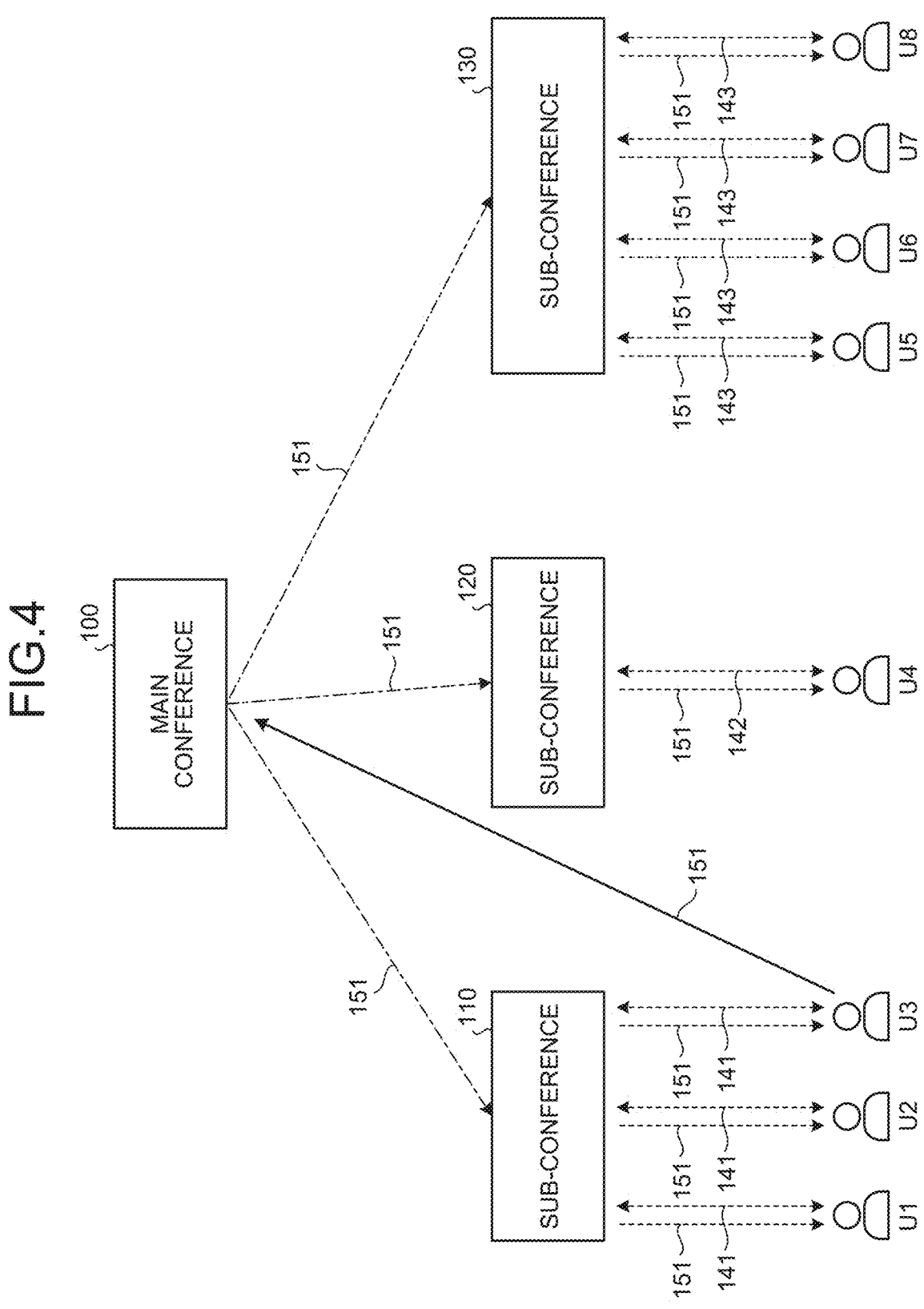
FIG. 4 is a diagram for explaining a remote conference method according to the first embodiment.

A remote conference management method according to the first embodiment will be described with reference to FIG. 4. FIG. 4 is a diagram for explaining a remote conference method according to the first embodiment.

In the example illustrated in FIG. 4, it is assumed that eight participants of a user U1, a user U2, a user U3, a user U4, a user U5, a user U6, a user U7, and a user U8 participate in the remote conference. It is assumed that the users U1 to U3 belong to a first organization. It is assumed that the user U4 belongs to a second organization different from the first organization. It is assumed that the users U5 to U8 belong to a third organization different from the first organization and the second organization.

The main conference management unit 36 sets a main conference 100 in which all the users U1 to U8 participate. The individual conference management unit 38 sets a sub-conference 110 in which the user U1 to the user U3 participate. The individual conference management unit 38 sets a sub-conference 120 in which the user U4 participates. The individual conference management unit 38 sets a sub-conference 130 in which the user U5 to the user U8 participate. That is, in the present embodiment, the participants of the remote conference participate in both the main conference and the sub-conference. The conference support device 10 manages the remote conference by setting a hierarchical structure of the main conference and the sub-conference.

In the present embodiment, utterance of a participant participating in the remote conference is shared only among participants participating in the same sub-conference in a default state. For example, the individual conference management unit 38 transmits and receives second utterance data 141 indicating an utterance content of utterance of any one of the user U1 to the user U3 participating in the sub-conference 110 among the terminal devices 12 of the user U1 and the user U3 via the sub-conference 110 in the default state. For example, the individual conference management unit 38 transmits and receives second utterance data 142 indicating an utterance content of utterance of the user U4 participating in the sub-conference 120 in the terminal device 12 of the user U4 via the sub-conference 120 in the default state. For example, the individual conference management unit 38 transmits and receives third utterance data 143 indicating utterance contents of the user U5 to the user U8 participating in the sub-conference 130 among the terminal devices 12 of the user U5 to the user U8 via the sub-conference 130 in the default state.

The user U1 to the user U8 can make utterance in the main conference using the terminal device 12. For example, the user U1 to the user U8 can make utterance in the main conference by switching a state of the terminal device 12 from the default state to an in-utterance state. For example, in a case where the user U3 switches a state of the terminal device 12 to an in-utterance state and makes utterance with respect to the main conference 100, the terminal device 12 of the user U3 transmits the utterance content to the main conference management unit 36 as first utterance data 151.

The first utterance data 151 is transmitted from the main conference 100 to the sub-conference 110, the sub-conference 120, and the sub-conference 130. That is, the main conference management unit 36 transmits the first utterance data 151 to the individual conference management unit 38.

In the sub-conference 110, the individual conference management unit 38 transmits the first utterance data 151 to the terminal devices 12 of the user U1 to the user U3.

In the sub-conference 120, the individual conference management unit 38 transmits the first utterance data 151 to the terminal device 12 of the user U4.

In the sub-conference 130, the individual conference management unit 38 transmits the first utterance data 151 to the terminal devices 12 of the user U5 to the user U8.

That is, in the present embodiment, the second utterance data 141, the second utterance data 142, and the third utterance data 143 indicating the utterance contents made in the sub-conference 110, the sub-conference 120, and the sub-conference 130 are not transmitted to the main conference 100. As a result, in the present embodiment, the utterance content made in the sub-conference is prevented from being transmitted to another sub-conference.

Furthermore, in the present embodiment, the utterance with respect to the main conference 100 is transmitted to the terminal devices 12 of the user U1 to the user U8 via the sub-conference 110, the sub-conference 120, and the sub-conference 130. That is, in the present embodiment, the sub-conference transmits the second utterance data indicating the utterance content with respect to the same sub-conference and the first utterance data with respect to the main conference to each participant participating in the same sub-conference.

[Conference Preparation Processing]

Figure 5:
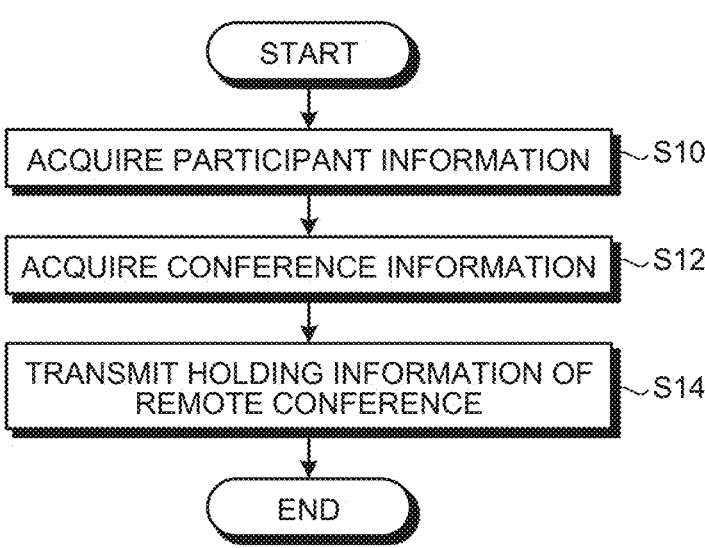
FIG. 5 is a flowchart illustrating a flow of remote conference preparation processing according to the first embodiment.

Remote conference preparation processing according to the first embodiment will be described with reference to FIG. 5. FIG. 5 is a flowchart illustrating a flow of the remote conference preparation processing according to the first embodiment. The processing illustrated in FIG. 5 is processing executed by a terminal device 12 of a host of the remote conference.

The control unit 60 acquires participant information of participants in the remote conference (step S10). Specifically, the control unit 60 acquires the participant information input to the input unit 50 by the host of the remote conference. Then, the processing proceeds to step S12.

The control unit 60 acquires conference information of the remote conference (step S12). Specifically, the control unit 60 acquires the conference information input to the input unit 50 by the host of the remote conference on a system screen. Then, the processing proceeds to step S14.

The control unit 60 transmits holding information of the remote conference to the participants of the remote conference (step S14). Specifically, the control unit 60 transmits the holding information including a main conference ID and a sub-conference ID to the terminal devices 12 of the participants of the remote conference via the communication unit 58. Then, the processing of FIG. 5 ends.

[Conference Start Processing]

Figure 6:
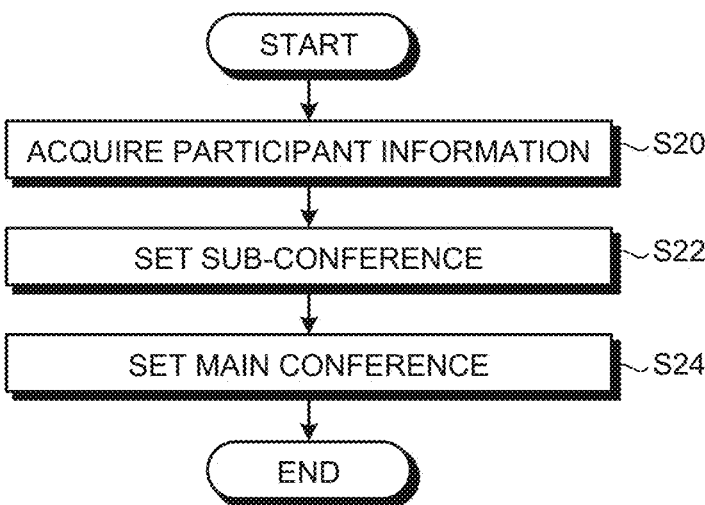
FIG. 6 is a flowchart illustrating a flow of remote conference start processing according to the first embodiment.

Remote conference start processing according to the first embodiment will be described with reference to FIG. 6. FIG. 6 is a flowchart illustrating a flow of the remote conference start processing according to the first embodiment. The processing illustrated in FIG. 6 is processing executed when the conference support device 10 starts a remote conference.

The participant information acquisition unit 32 acquires participant information from the terminal devices 12 of the participants participating in the remote conference (step S20). Specifically, the participant information acquisition unit 32 acquires the participant information when a participant starts communication with the conference support device 10 using the terminal device 12 in order to participate in the remote conference. Then, the processing proceeds to step S22.

The individual conference management unit 38 sets a sub-conference (step S22). Specifically, the individual conference management unit 38 secures a resource such as a network session for a call among participants participating in the sub-conference. The individual conference management unit 38 secures a resource for transmitting second utterance data obtained by converting an utterance content related to utterance with respect to the sub-conference into data to the same sub-conference. The second utterance data includes various types of information such as utterer information, voice data, and image data. The individual conference management unit 38 registers the sub-conference to a main conference managed by the main conference management unit 36. Then, the processing proceeds to step S24.

The main conference management unit 36 sets a main conference (step S24). Specifically, the main conference management unit 36 receives registrations of all the participants of the remote conference. The main conference management unit 36 secures a resource for transmitting first utterance data obtained by converting an utterance content related to utterance with respect to the main conference into data to the sub-conference. The first utterance data includes various types of information such as utterer information, voice data, and image data. Then, the processing of FIG. 6 ends.

[Processing of Terminal Device]

Figure 7:
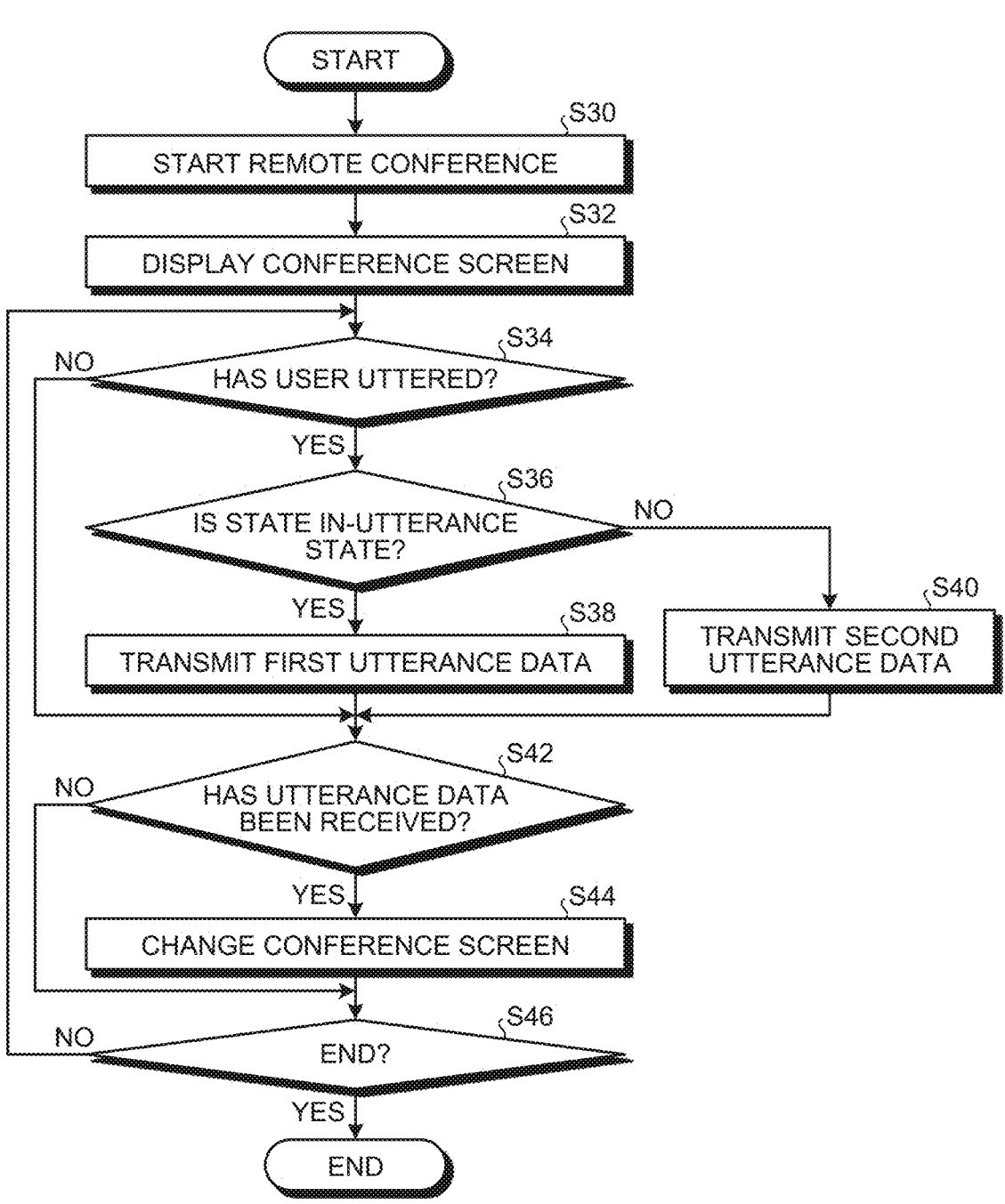
FIG. 7 is a flowchart illustrating a flow of processing of the terminal device according to the first embodiment.

Processing contents of the terminal device according to the first embodiment will be described with reference to FIG. 7. FIG. 7 is a flowchart illustrating a flow of processing of the terminal device according to the first embodiment. FIG. 7 illustrates processing executed by the terminal device 12 of each participant when a remote conference is being held.

The control unit 60 starts a remote conference (step S30). Specifically, the control unit 60 establishes communication with the conference support device 10 and performs registration to the main conference and the sub-conference, thereby starting the remote conference. Then, the processing proceeds to step S32.

Figure 8:
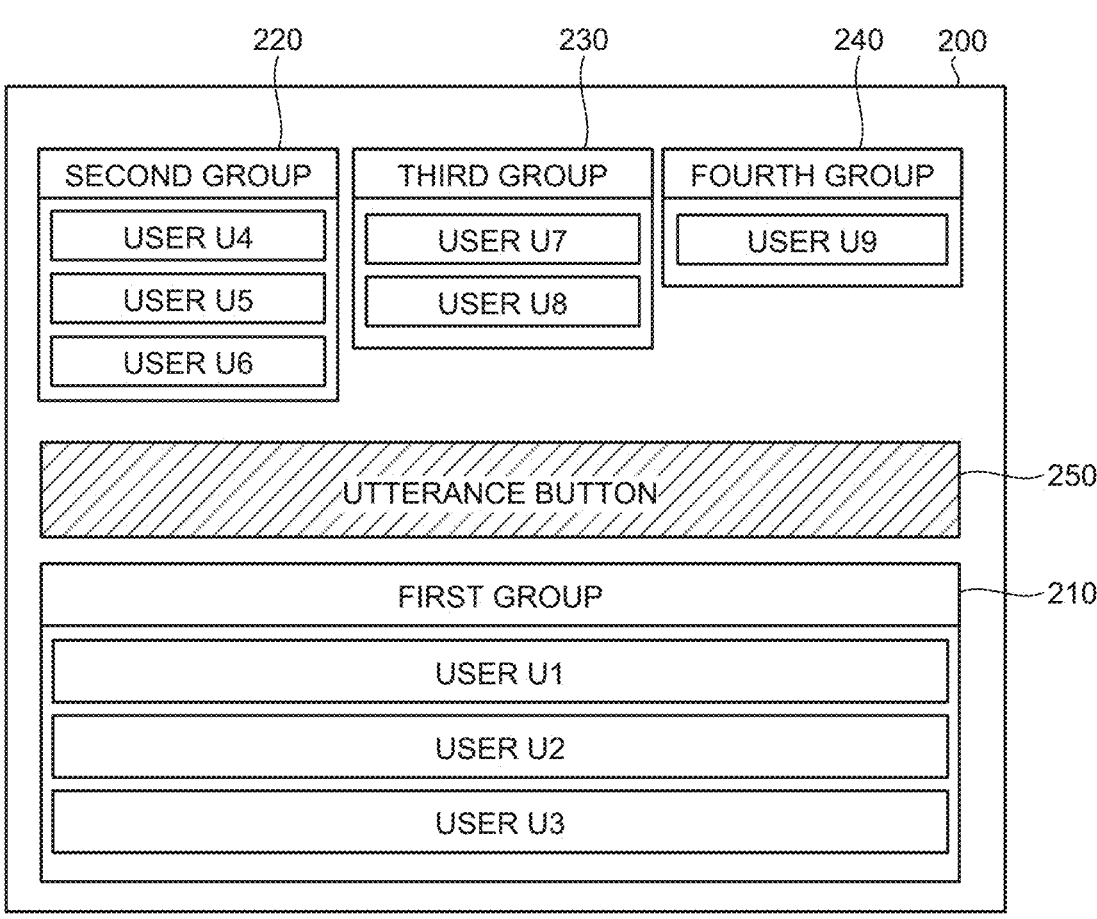
FIG. 8 is a diagram illustrating an example of a conference screen according to the first embodiment.

The control unit 60 causes the display unit 52 to display a conference screen (step S32). FIG. 8 is a diagram illustrating an example of the conference screen according to the first embodiment. In the example illustrated in FIG. 8, a conference screen 200 includes a first group 210, a second group 220, a third group 230, a fourth group 240, and an utterance button 250.

The first group 210 indicates a group to which a participant using the terminal device 12 belongs. Three of the user U1, the user U2, and the user U3 belong to the first group 210. In fields of the user U1, the user U2, and the user U3, a name, a nickname, and the like are displayed. Participants belonging to the first group 210 are registered to a first sub-conference.

The second group 220 indicates a group different from the first group 210. Three of the user U4, the user U5, and the user U6 belong to the second group 220. In fields of the user U4, the user U5, and the user U6, a name, a nickname, and the like are displayed. Participants belonging to the second group 220 are registered to a second sub-conference different from the first sub-conference.

The third group 230 indicates a group different from the first group 210 and the second group. Two of the user U7 and the user U8 belong to the third group 230. In fields of the user U7 and the user U8, a name, a nickname, and the like are displayed. Participants belonging to the third group 230 are registered to a third sub-conference different from the first sub-conference and the second sub-conference.

The fourth group 240 indicates a group different from the first group 210, the second group 220, and the third group 230. One user U9 belongs to the fourth group 240. In a field of the user U9, a name, a nickname, and the like are displayed. A participant belonging to the fourth group 240 is registered in a fourth sub-conference different from the first sub-conference, the second sub-conference, and the third sub-conference.

The utterance button 250 is a button pressed when utterance is made with respect to the main conference. The user of the terminal device 12 can switch a state of the terminal device 12 from a default state to an in-utterance state by pressing the utterance button 250 using the input unit 50. For example, in the present embodiment, the state becomes the in-utterance state only while the utterance button 250 is pressed. In this case, while the utterance button 250 is pressed, the type information acquisition unit 34 acquires type information indicating that the utterance is made with respect to the main conference. When the utterance button 250 is not pressed, the type information acquisition unit 34 acquires type information indicating whether the utterance is utterance with respect to the sub-conference. The operation of pressing the utterance button 250 is a type of predetermined operation determining that the utterance is made in the main conference.

Returning to FIG. 7. The control unit 60 determines whether a user of the terminal device 12 has uttered (step S34). Specifically, when voice is input to the input unit 50, the control unit 60 determines that the user has uttered. In a case where it is determined that the user has uttered (step S34; Yes), the processing proceeds to step S36. When it is not determined that the user has uttered (step S34; No), the processing proceeds to step S42.

In a case where it is determined as Yes in step S34, the control unit 60 determines whether the state is an in-utterance state (step S36). Specifically, the control unit 60 determines that the state is an in-utterance state while the utterance button 250 is pressed, and determines that the state is a default state when the utterance button 250 is not pressed. In a case where it is determined that the state is an in-utterance state (step S36; Yes), the processing proceeds to step S38. When it is not determined that the state is an in-utterance state (step S36; No), the processing proceeds to step S40.

Figure 9:
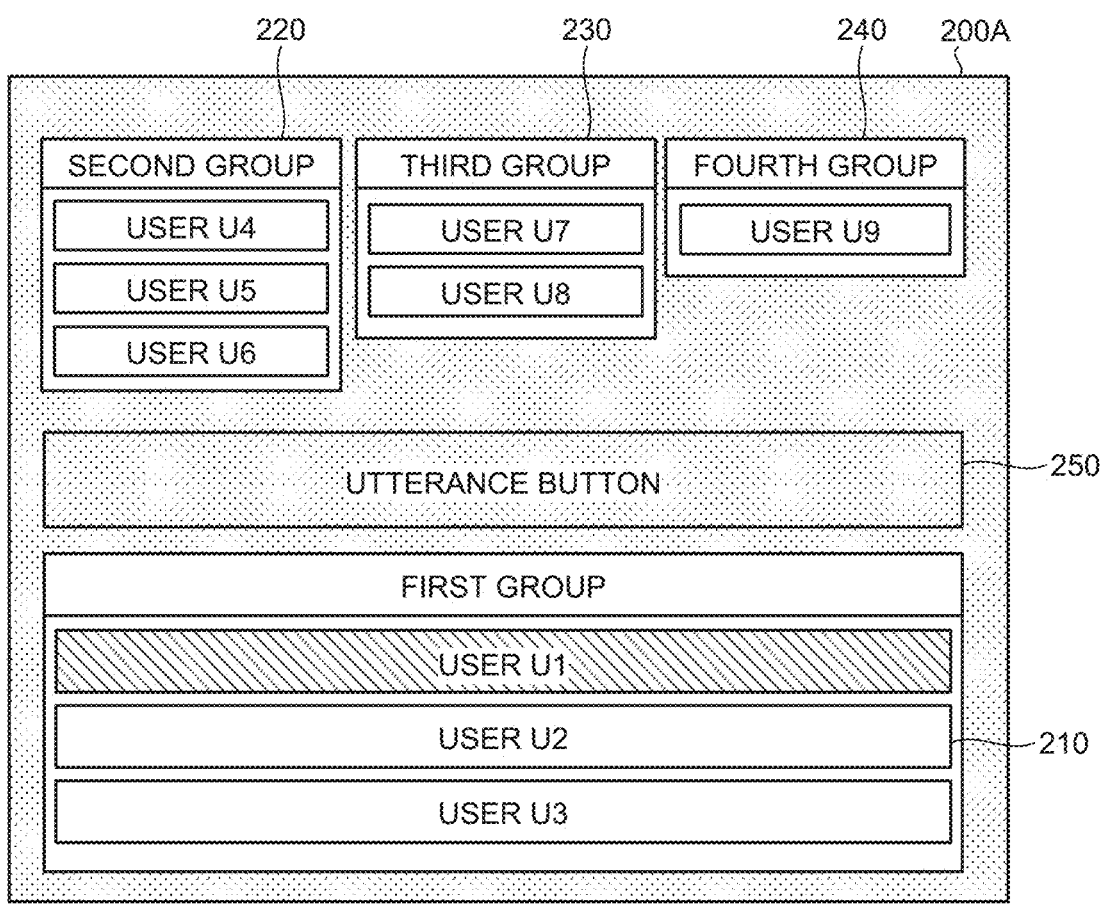
FIG. 9 is a diagram illustrating an example of the conference screen in a case of an in-utterance state according to the first embodiment.

In a case where it is determined as Yes in step S36, the control unit 60 transmits first utterance data related to an utterance content with respect to a main conference to the conference support device 10 via the communication unit 58 (step S38). FIG. 9 is a diagram illustrating an example of the conference screen in a case of the in-utterance state according to the first embodiment. As illustrated in FIG. 9, the control unit 60 highlights an entire conference screen 200A. For example, the control unit 60 highlights the entire conference screen 200A by displaying it in red. The control unit 60 highlights the field of the user U1 who is uttering. For example, the control unit 60 highlights the field of the user U1 by displaying the field in green. Then, the processing proceeds to step S42.

Figure 10:
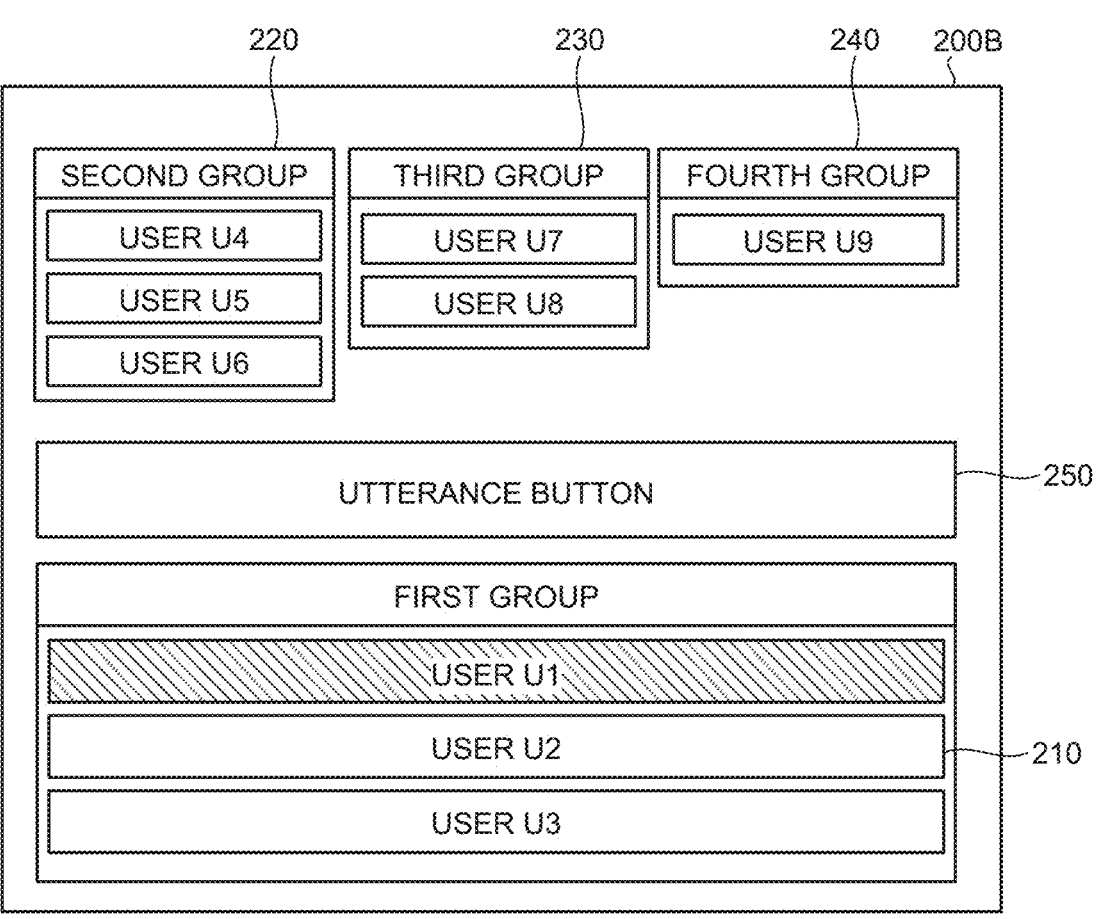
FIG. 10 is a diagram illustrating an example of the conference screen in a case of a default state according to the first embodiment.

In a case where it is determined as No in step S36, the control unit 60 transmits second utterance data related to an utterance content with respect to a sub-conference to the conference support device 10 via the communication unit 58 (step S40). FIG. 10 is a diagram illustrating an example of the conference screen in a case of the default state according to the first embodiment. As illustrated in FIG. 10, the control unit 60 highlights the field of the user U1 who is uttering as illustrated in a conference screen 200B. For example, the control unit 60 highlights the field of the user U1 by displaying the field in green. Then, the processing proceeds to step S42.

In a case where it is determined as No in step S34, after step S38 and after step S40, the control unit 60 determines whether utterance data has been received from the conference support device 10 (step S42). When it is determined that utterance data has been received (step S42; Yes), the processing proceeds to step S44. When it is not determined that utterance data has been received (step S42; No), the processing proceeds to step S46.

Figure 11:
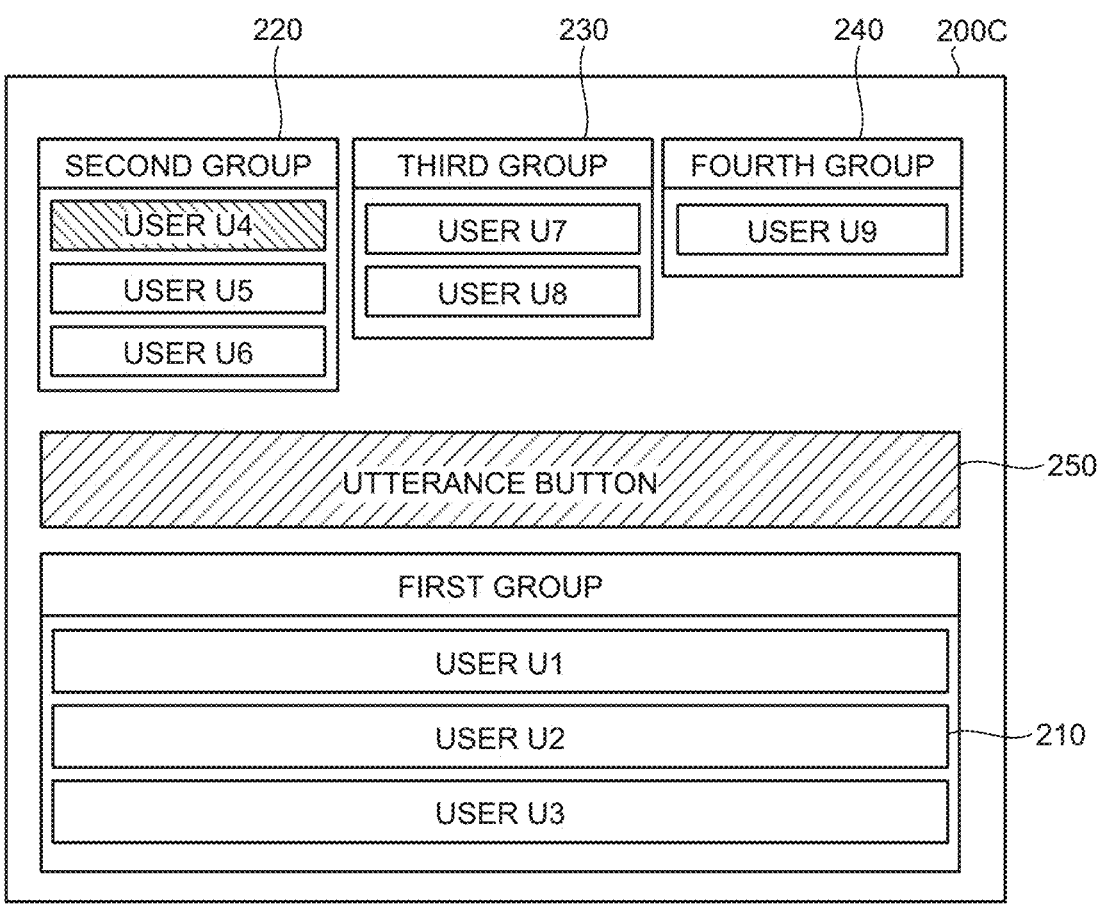
FIG. 11 is a diagram illustrating an example of a display mode of the conference screen according to the first embodiment.
Figure 12:
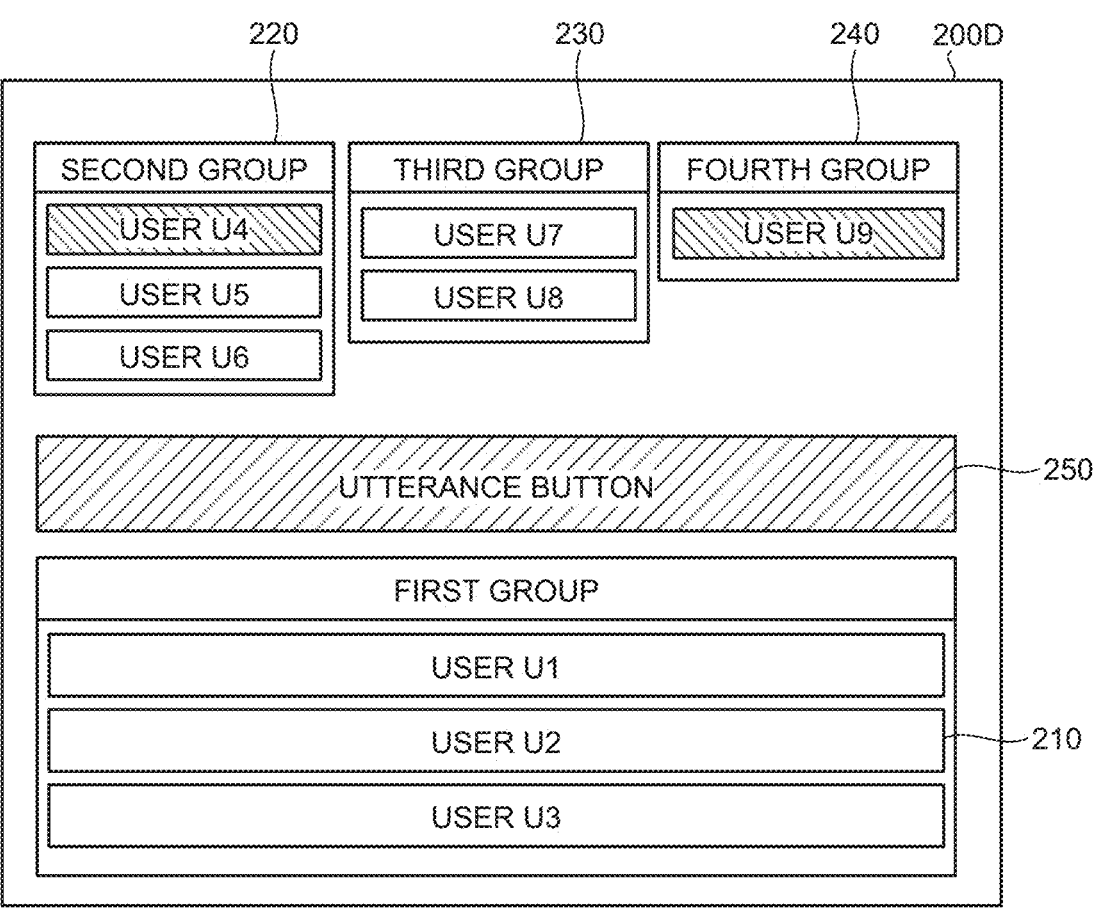
FIG. 12 is a diagram illustrating an example of the display mode of the conference screen according to the first embodiment.
Figure 13:
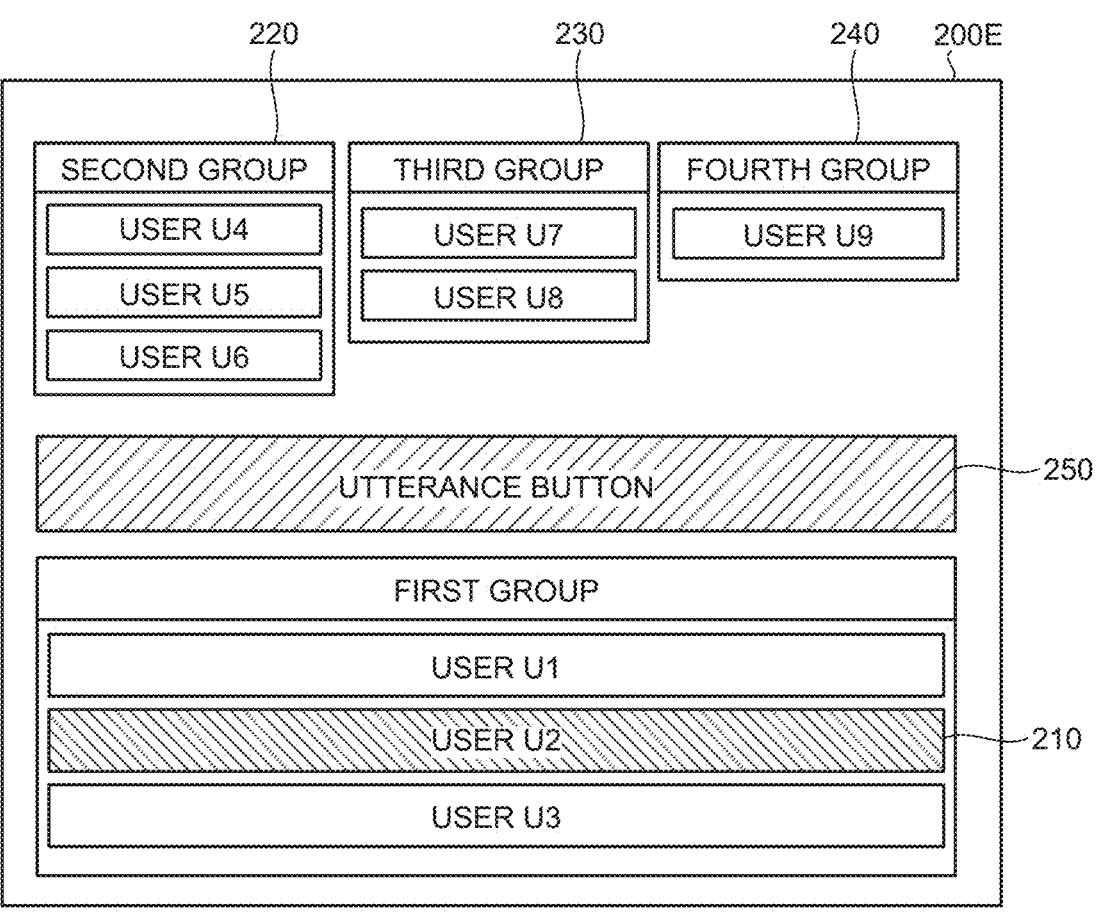
FIG. 13 is a diagram illustrating an example of the display mode of the conference screen according to the first embodiment.

In a case where it is determined as Yes in step S42, the control unit 60 changes a display mode of the conference screen (step S44). FIGS. 11, 12, and 13 are diagrams illustrating examples of the display mode of the conference screen according to the first embodiment.

As illustrated in FIG. 11, for example, in a case where first utterance data has been received from the user U4 of the second group 220, the control unit 60 highlights frames of a conference screen 200C and the second group 220. For example, the control unit 60 highlights the frames of the conference screen 200C and the second group 220 in yellow. The control unit 60 highlights the field of the user U4. For example, the control unit 60 highlights the field of the user U4 by displaying the field in green.

As illustrated in FIG. 12, for example, in a case where first utterance data has been received from the user U4 of the second group 220 and the user U9 of the fourth group 240, the control unit 60 highlights frames of a conference screen 200D, the second group 220, and the fourth group 240. For example, the control unit 60 highlights frames of the conference screen 200C, the second group 220, and the fourth group 240 in yellow. The control unit 60 highlights the fields of the user U4 and the user U9. For example, the control unit 60 highlights the fields of the user U4 and the user U9 by displaying the fields in green.

As illustrated in FIG. 13, for example, in a case where the control unit 60 has been received first utterance data from the user U2 of the same first group 210 as the user U1 who is the user of the terminal device 12, the control unit 60 highlights frames of a conference screen 200E and the first group 210. For example, the control unit 60 highlights the frames of the conference screen 200E and the first group 210 in yellow. The control unit 60 highlights the field of the user U2. For example, the control unit 60 highlights the field of the user U2 by displaying the field in green.

In the example illustrated in FIG. 13, the control unit 60 may change the display mode of the conference screen 200E depending on whether first utterance data has been received from the user U2 and second utterance data has been received from the user U2. For example, the control unit 60 may highlight the entire conference screen 200E in a case where the first utterance data has been received from the user U2, and highlight only the field of the first group 210 in a case where the second utterance data has been received from the user U2. As a result, the user U1 can easily grasp whether the utterance of the user U2 is utterance with respect to the main conference or utterance with respect to the sub-conference.

Returning to FIG. 7. In a case where it is determined as No in step S42 and after step S44, the control unit 60 determines whether to end the processing (step S46). Specifically, the control unit 60 determines to end the processing when the remote conference has ended and when processing of ending the remote conference has been received. In a case where it is determined to end the processing (step S46; Yes), the processing of FIG. 7 ends. When it is not determined to end the processing (step S46; No), the processing proceeds to step S34.

[Processing of Terminal Device]

Figure 14:
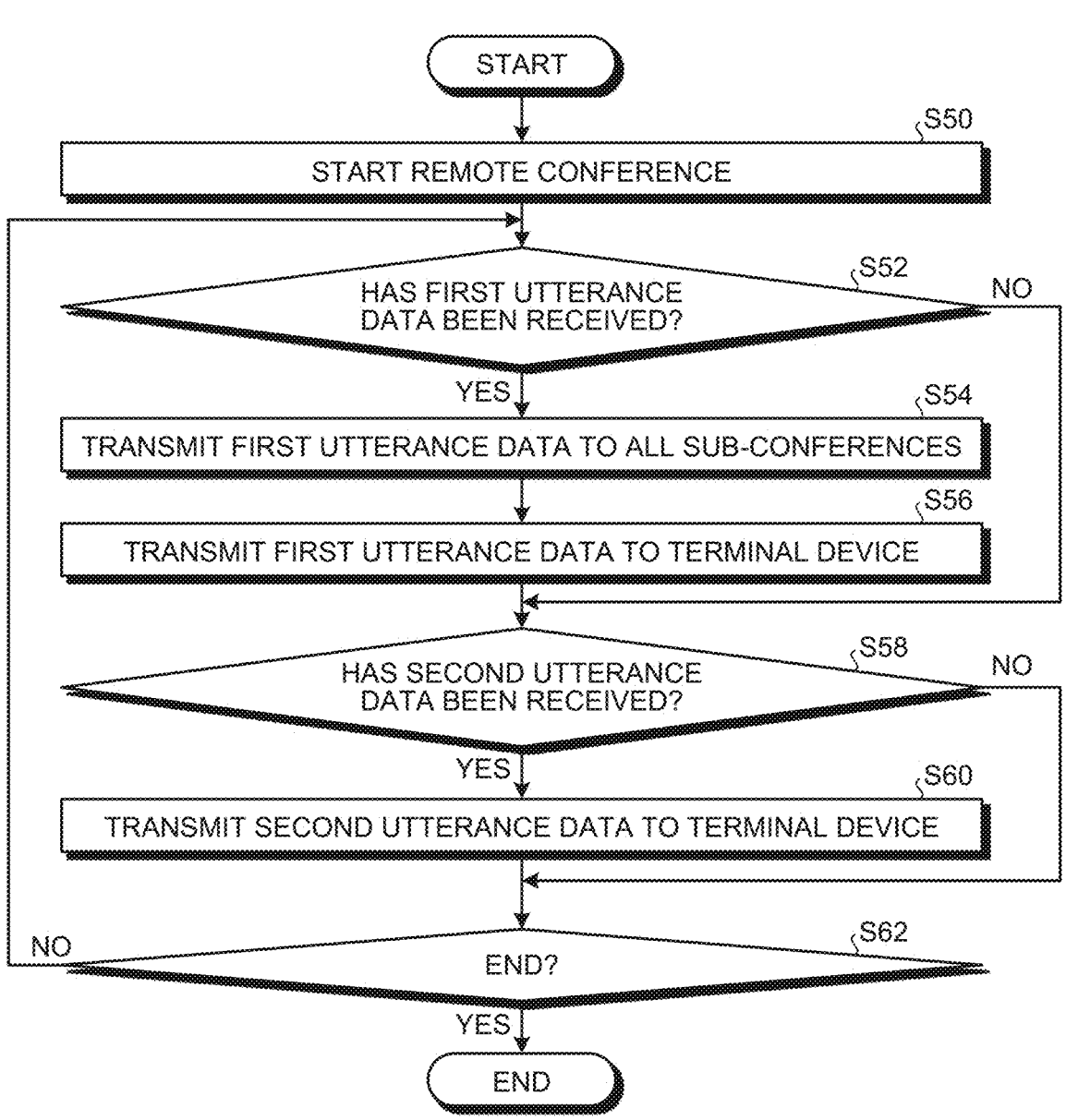
FIG. 14 is a flowchart illustrating a flow of processing of the conference support device according to the first embodiment.

Processing contents of the conference support device according to the first embodiment will be described with reference to FIG. 14. FIG. 14 is a flowchart illustrating a flow of processing of the conference support device according to the first embodiment. FIG. 14 illustrates processing executed by the conference support device 10 of each participant when a remote conference is being held.

The control unit 24 starts a remote conference (step S50). Specifically, in the control unit 24, the main conference management unit 36 sets a main conference, and the individual conference management unit 38 sets a sub-conference and registers the sub-conference in the main conference, thereby starting the remote conference. Then, the processing proceeds to step S52.

The main conference management unit 36 determines whether first utterance data with respect to the main conference has been received (step S52). When it is determined that first utterance data has been received (step S52; Yes), the processing proceeds to step S54. When it is not determined that first utterance data has been received (step S52; No), the processing proceeds to step S58.

In a case where it is determined as Yes in step S52, the main conference management unit 36 transmits the first utterance data to all the sub-conferences set by the individual conference management unit 38 (step S54). Specifically, the main conference management unit 36 transmits the first utterance data to the individual conference management unit 38. Then, the processing proceeds to step S56.

The individual conference management unit 38 transmits the first utterance data to each terminal device 12 participating in each sub-conference room (step S56). Then, the processing proceeds to step S58.

In a case where it is determined as No in step S52 and after step S56, the individual conference management unit 38 determines whether second utterance data with respect to the sub-conference has been received (step S58). When it is determined that second utterance data has been received (step S58; Yes), the processing proceeds to step S60. When it is not determined that second utterance data has been received (step S58; No), the processing proceeds to step S62.

In a case where it is determined as Yes in step S58, the individual conference management unit 38 transmits the second utterance data to the terminal devices 12 belonging to the same sub-conference as the sub-conference to which the terminal device 12 that has transmitted the second utterance data belongs (step S60). Then, the processing proceeds to step S62.

In a case where it is determined as No in step S58 and after step S60, the control unit 24 determines whether to end the processing (step S62). Specifically, the control unit 24 determines to end the processing when the remote conference has ended. In a case where it is determined to end the processing (step S62; Yes), the processing of FIG. 14 ends. When it is not determined to end the processing (step S62; No), the processing proceeds to step S52.

As described above, in the first embodiment, the main conference and the sub-conference are set in the remote conference, and control is performed so that utterance of the main conference flows to the sub-conference and utterance of the sub-conference does not flow to the main conference. As a result, in the first embodiment, it is possible to perform control so that utterance of a specific sub-conference is not transmitted to another sub-conference.

Second Embodiment

[Processing of Terminal Device]

Figure 15:
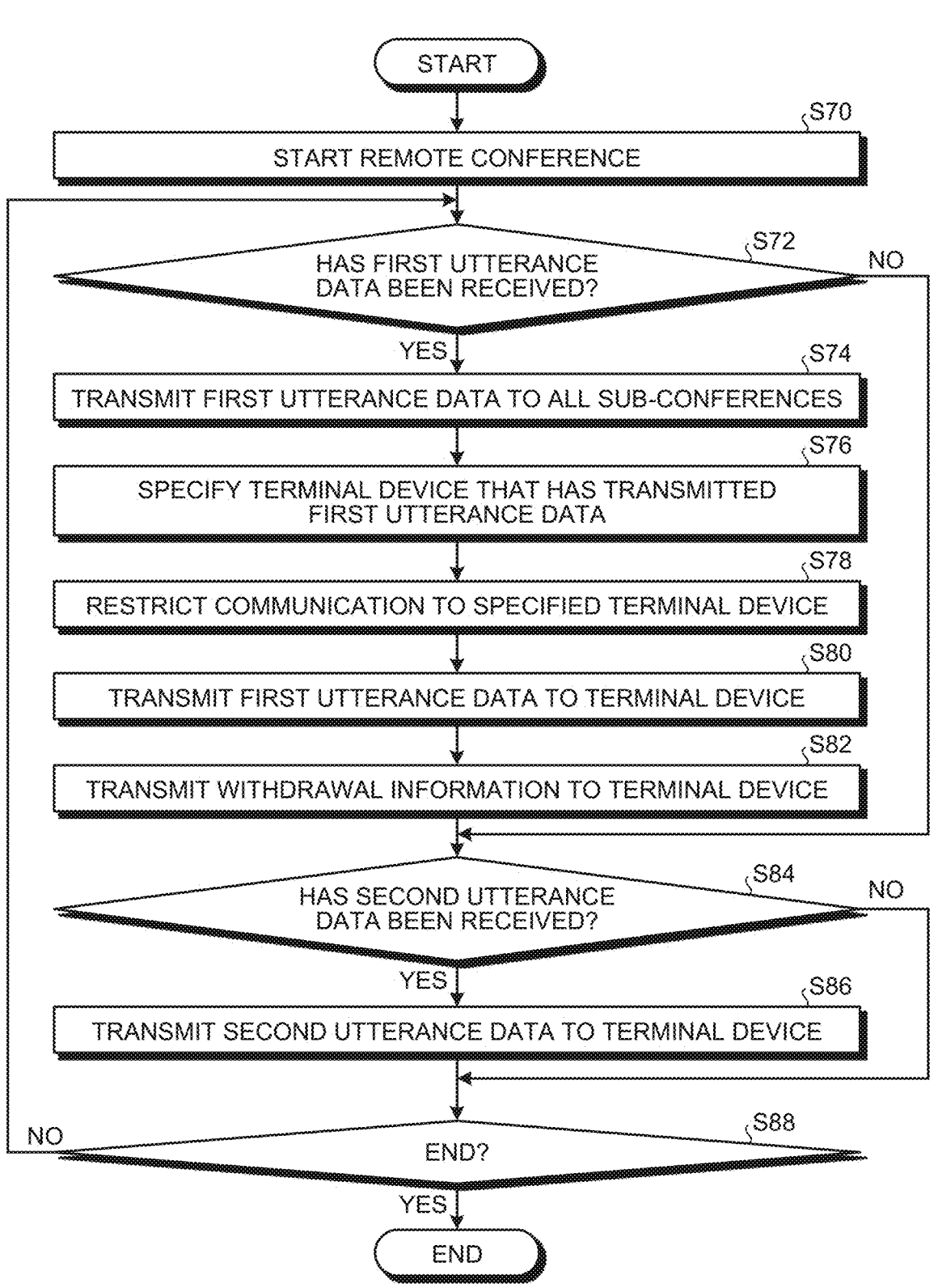
FIG. 15 is a flowchart illustrating a flow of processing of a conference support device according to a second embodiment.

Processing contents of the conference support device according to a second embodiment will be described with reference to FIG. 15. FIG. 15 is a flowchart illustrating a flow of processing of the conference support device according to the second embodiment. FIG. 15 illustrates processing executed by the conference support device 10 of each participant when a remote conference is being held.

In the second embodiment, the terminal device 12 that has transmitted first utterance data is specified, and communication of the specified terminal device 12 is restricted. In the second embodiment, it is assumed that the terminal device 12 transmits first utterance data and second utterance data to the conference support device 10, including terminal identification information for uniquely specifying the terminal device itself.

Since the processing from step S70 to step S74 is the same as the processing from step S50 to step S54 illustrated in FIG. 14, the description thereof will be omitted.

After step S74, the individual conference management unit 38 specifies the terminal device 12 that has transmitted first utterance data (step S76). Specifically, the individual conference management unit 38 specifies the terminal device 12 based on the terminal identification information included in the first utterance data. For example, the terminal identification information includes an ID of the terminal device 12, user information using the terminal device 12, information related to a sub-conference to which the terminal device 12 belongs, and the like. The terminal identification information may include other information. Then, the processing proceeds to step S78.

The individual conference management unit 38 restricts communication to the specified terminal device 12 (step S78). Specifically, the individual conference management unit 38 prohibits transmission and reception of information between the specified terminal device 12 and the individual conference management unit 38. Then, the processing proceeds to step S80.

The individual conference management unit 38 transmits the first utterance data to the terminal devices 12 other than the specified terminal device 12 (step S80). As a result, the terminal device 12 of a user who is uttering in the main conference does not output the voice related to the first utterance data and the second utterance data during the utterance of the user, and thus the usability is improved. Then, the processing proceeds to step S82.

The individual conference management unit 38 transmits withdrawal information of the specified terminal device 12 to the terminal devices 12 participating in the same sub-conference as the specified terminal device 12 (step S82). As a result, the users of the terminal devices 12 participating in the sub-conference can easily grasp that a user of the same sub-conference is uttering in the main conference. Then, the processing proceeds to step S84.

Since the processing from step S84 to step S88 is the same as the processing from step S58 to step S62 illustrated in FIG. 14, the description thereof will be omitted. Note that in step S84, in a case where second utterance data has been received from the terminal device 12 belonging to the same sub-conference as the terminal device 12 that has transmitted the first utterance data, the second utterance data is not transmitted to the terminal device 12 that has transmitted the first utterance data in step S86.

As described above, in the second embodiment, transmission of the first utterance data and the second utterance data to the terminal device of the user is prohibited while the user is uttering with respect to the main conference. As a result, the voice is not output from the terminal device 12 while the user is uttering, so that usability is improved.

Third Embodiment

[Processing of Terminal Device]

Processing contents of the conference support device according to a third embodiment will be described with reference to FIG. 16. FIG. 16 is a flowchart illustrating a flow of processing of the conference support device according to the third embodiment. FIG. 16 illustrates processing executed by the conference support device 10 of each participant when a remote conference is being held.

In the third embodiment, in the second embodiment, in a case where utterance is made in a sub-conference while communication between the terminal device 12 and the individual conference management unit 38 is restricted, processing of storing a content of the utterance is executed.

Since the processing from step S100 to step S114 is the same as the processing from step S70 to step S84 illustrated in FIG. 15, the description thereof will be omitted.

In a case where it is determined as Yes in step S114, the individual conference management unit 38 determines whether second utterance data has been received from the terminal device 12 belonging to the same sub-conference as the terminal device 12 that has transmitted first utterance data (step S116). Specifically, the individual conference management unit 38 determines whether second utterance data has been received from the terminal device 12 belonging to the same sub-conference as the terminal device 12 that has transmitted first utterance data, based on the terminal identification information included in the second utterance data. When it is determined that the second utterance data has been received from the terminal device 12 belonging to the same sub-conference as the terminal device 12 that has transmitted the first utterance data (step S116; Yes), the processing proceeds to step S118. When it is not determined that the second utterance data has been received from the terminal device 12 belonging to the same sub-conference as the terminal device 12 that has transmitted the first utterance data (step S116; No), the processing proceeds to step S120.

In a case where it is determined as Yes in step S116, the individual conference management unit 38 stores the second utterance data received while communication between the terminal device 12 that has transmitted the first utterance data and the individual conference management unit 38 is restricted in the storage unit 22 as voice data (step S118). At this time, the main conference management unit 36 may store, as the voice data, the first utterance data received while the communication between the terminal device 12 that has transmitted the first utterance data and the individual conference management unit 38 is restricted. In the storage unit 22, the first utterance data and the second utterance data may be stored as separate voice data, or may be stored as one voice data. Then, the processing proceeds to step S120.

Since the processing in steps S120 and S122 is the same as the processing in steps S86 and S88 illustrated in FIG. 15, respectively, the description thereof will be omitted.

Figure 17:
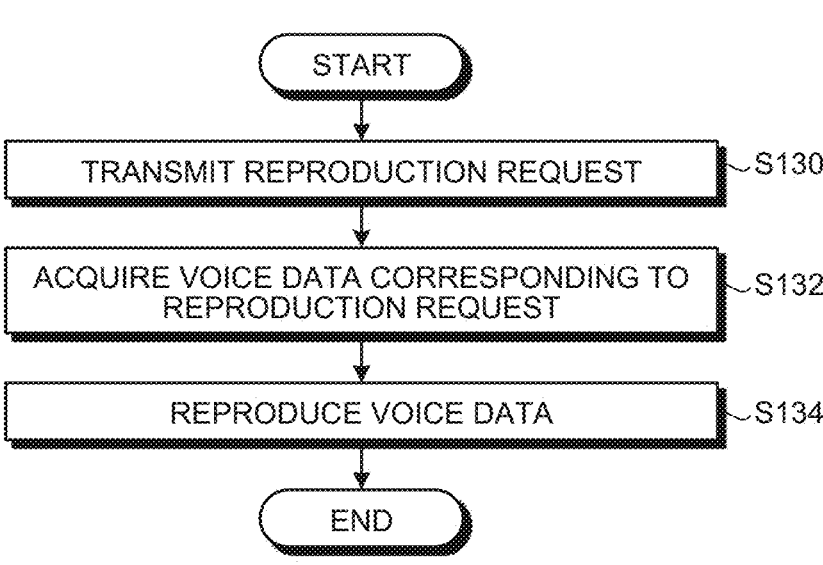
FIG. 17 is a flowchart illustrating a flow of reproduction processing according to the third embodiment.

Voice data reproduction processing according to the third embodiment will be described with reference to FIG. 17. FIG. 17 is a flowchart illustrating a flow of the reproduction processing according to the third embodiment. FIG. 17 illustrates processing executed by the terminal device 12 of the user who has uttered in the main conference after the end of the utterance with respect to the main conference.

The control unit 60 transmits a reproduction request corresponding to operation information input to the input unit 50 to the conference support device 10 via the communication unit 58 (step S130). Specifically, the user can select, as the reproduction request, voice data for only a main conference room, voice data for only a sub-conference room, and voice data for both the main conference room and the sub-conference room. Then, the processing proceeds to step S132.

The control unit 60 acquires the voice data corresponding to the reproduction request from the conference support device 10 via the communication unit 58 (step S132). Then, the processing proceeds to step S134.

The control unit 60 causes the voice output unit 54 to output the acquired voice data (step S134).

As described above, in the third embodiment, it is possible to reproduce voice data of conversation made while transmission of the first utterance data and the second utterance data to the terminal device of the user is prohibited, while the user is uttering with respect to the main conference. As a result, the user can grasp the content of the conversation made in the main conference and the sub-conference while communication has been restricted.

Each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like. Note that this configuration by distribution and integration may be performed dynamically.

In the embodiment of the present disclosure, a main conference and an individual conference are configured to be managed in the same conference support device 10, but it is not always necessary to realize them in the same conference support device 10. For example, a plurality of conference support devices 10 may be separately prepared, the conference support devices may be connected by a communication network, one conference support device may be configured to manage the main conference, the other conference support device may be configured to manage the individual conference, and the plurality of conference support devices may be configured to operate in cooperation with each other.

The present disclosure includes matters that contribute to the realization of the "build foundations for industry and technological innovation" of the SDGs and contribute to the value creation by the IoT solution.

According to the present disclosure, it is possible to perform control so that conversation of specific participants is not transmitted to the whole during a remote conference.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conference support device that manages a main conference and a plurality of individual conferences to which terminal devices participating in the main conference belong, the conference support device comprising:
    at least one processor; and at least one non-transitory memory storing instructions that, when executed by the at least one processor, cause the at least one processor to:
        set the main conference and manage connection of the terminal devices participating in the main conference;
        associate the plurality of individual conferences with the main conference and manage connection of the terminal devices participating in each of the plurality of individual conferences;
        transmit first utterance data to the individual conferences in a case where the first utterance data indicating an utterance content with respect to the main conference has been received from the terminal device;
        transmit, in the individual conferences, in a case where the first utterance data has been received, the first utterance data to the terminal devices participating in each of the plurality of individual conferences; and
        transmit, in a case where second utterance data indicating an utterance content with respect to one individual conference has been received from one terminal device participating in the one individual conference, the second utterance data to the terminal devices participating in the one individual conference.

2. The conference support device according to claim 1, wherein the first utterance data includes terminal identification information for uniquely identifying the plurality of terminal devices, and
    wherein the instructions, when executed by the at least one processor, further cause the at least one processor to:
        specify the terminal identification information included in the first utterance data; and
        transmit the first utterance data and the second utterance data to other of the terminal devices that are other than the terminal device that has transmitted the first utterance data.

3. The conference support device according to claim 2, further comprising:
    a storage unit configured to store the first utterance data and the second utterance data,
    wherein the instructions, when executed by the at least one processor, further cause the at least one processor to:
        prohibit, while the first utterance data is being transmitted, transmission and reception between the terminal device transmitting the first utterance data and an individual conference management unit that facilitates management of the connection of the terminal devices participating in each of the plurality of individual conferences;
        store, in the storage unit, individual conference data indicating an utterance content made in the individual conference whose transmission and reception is prohibited; and
        transmit, after the terminal device that has transmitted the first utterance data finishes utterance in the main conference, the individual conference data to the terminal device that has transmitted the first utterance data in response to a request from the terminal device that has transmitted the first utterance data.

4. The conference support device according to claim 2, wherein the instructions, when executed by the at least one processor, further cause the at least one processor to:
    acquire type information from the terminal device; and
    receive the first utterance data when the type information indicates that the utterance content is with respect to the main conference.

5. The conference support device according to claim 3, wherein the instructions, when executed by the at least one processor, further cause the at least one processor to:
    acquire type information from the terminal device; and
    receive the first utterance data when the type information indicates that the utterance content is with respect to the main conference.

6. The conference support device according to claim 1, wherein the instructions, when executed by the at least one processor, further cause the at least one processor to:
    acquire type information from the terminal device; and
    receive the first utterance data when the type information indicates that the utterance content is with respect to the main conference.

7. A conference support method for managing a main conference and a plurality of individual conferences to which terminal devices participating in the main conference belong, the conference support method comprising:
    a step of setting the main conference and managing connection of the terminal devices participating in the main conference;
    a step of associating the plurality of individual conferences with the main conference and managing connection of the terminal devices participating in each of the plurality of individual conferences;
    a step of transmitting first utterance data to the individual conferences in a case where the first utterance data indicating an utterance content with respect to the main conference has been received from the terminal device;
    a step of transmitting, in the individual conference, in a case where the first utterance data has been received, the first utterance data to the terminal devices participating in each of the plurality of individual conferences; and
    a step of transmitting, in the individual conference, in a case where second utterance data indicating an utterance content with respect to one individual conference has been received from one terminal device participating in the one individual conference, the second utterance data to the terminal devices participating in the one individual conference.

* * * * *